(12) United States Patent
Georgy et al.

(10) Patent No.: US 11,529,838 B2
(45) Date of Patent: Dec. 20, 2022

(54) METHOD AND SYSTEM FOR ESTIMATING VEHICLE BODY TILT

(71) Applicants: Jacques Georgy, Calgary (CA); Christopher Goodall, Calgary (CA); Abdelrahman Ali, Calgary (CA); Amr Al-Hamad, Calgary (CA); Anas Mahmoud, Calgary (CA); Billy Cheuk Wai Chan, Calgary (CA); Medhat Omr, Calgary (CA)

(72) Inventors: Jacques Georgy, Calgary (CA); Christopher Goodall, Calgary (CA); Abdelrahman Ali, Calgary (CA); Amr Al-Hamad, Calgary (CA); Anas Mahmoud, Calgary (CA); Billy Cheuk Wai Chan, Calgary (CA); Medhat Omr, Calgary (CA)

(73) Assignee: InvenSense, Inc., San Jose, CA (US)

( * ) Notice: Subject to any disclaimer, the term of this patent is extended or adjusted under 35 U.S.C. 154(b) by 298 days.

(21) Appl. No.: 16/849,923

(22) Filed: Apr. 15, 2020

(65) Prior Publication Data

US 2020/0324607 A1  Oct. 15, 2020

Related U.S. Application Data

(60) Provisional application No. 62/834,347, filed on Apr. 15, 2019.

(51) Int. Cl.
*B60G 17/019* (2006.01)

(52) U.S. Cl.
CPC ............. *B60G 17/01908* (2013.01); *B60G 2400/0511* (2013.01); *B60G 2400/0512* (2013.01); *B60G 2400/204* (2013.01)

(58) Field of Classification Search
CPC ...... B60G 17/01908; B60G 2400/0511; B60G 2400/0512; B60G 2400/204; B60G 2400/0522; B60G 24/0532; B60G 2400/80; B60G 2400/90; B60G 2401/16; B60G 2401/28; B60G 2800/70; B60G 17/0182; G05D 1/021
See application file for complete search history.

(56) References Cited

U.S. PATENT DOCUMENTS

| | | | | |
|---|---|---|---|---|
| 2002/0156579 A1* | 10/2002 | Morgan | ............... | G01C 21/165 701/1 |
| 2005/0080543 A1* | 4/2005 | Lu | ............... | B60G 17/0195 701/91 |
| 2019/0033466 A1* | 1/2019 | Palella | ............... | G07C 5/008 |

* cited by examiner

*Primary Examiner* — Karen Beck (57) ABSTRACT

Vehicle body tilt, representing a difference between a vehicle body frame of reference and a wheel-base frame of reference, is determined by obtaining information from sensor assemblies for the vehicle body and for the wheel-base. Navigational solutions are generated for the sensor assemblies using motion sensor data from the assemblies and absolute navigational information. Correspondingly, vehicle body tilt is determined based at least in part on the vehicle body navigation solution and the wheel-base navigation solution.

22 Claims, 8 Drawing Sheets

METHOD AND SYSTEM FOR ESTIMATING VEHICLE BODY TILT

CROSS RERENCE TO RELATED APPLICATIONS

This application claims priority from and benefit of U.S. Provisional Patent Application Ser. No. 62/834,347, filed Apr. 15, 2019, which is entitled "SYSTEM AND METHOD FOR ESTIMATING TILT BETWEEN VEHICLE BODY AND WHEEL-BASE FRAME" and is incorporated by reference in its entirety.

FIELD OF THE PRESENT DISCLOSURE

This disclosure generally relates to dynamically determining a difference between a frame of reference for a moving vehicle body and a frame of reference of a wheel-base that engages the surface over which the vehicle travels, this difference is termed herein vehicle body tilt.

BACKGROUND

Most moving vehicles employ some variety of suspension in order to allow relative movement between wheels of the vehicle and the body of the vehicle which carries passengers and cargo. Proper operation of a suspension system allows the vehicle wheels to accommodate for irregularities in the surface to provide a smoother ride and to improve handling by maintaining the wheels in contact with surface. Typically, suspension systems rely on interconnected springs, shock absorbers, struts and/or other similar components with the goal of controlling aspects of the relative motion between the vehicle wheels and the vehicle body. Although the variety of different suspension systems are generally outside the scope of this disclosure, it should be recognized that a common characteristic of all is that relative motion between the vehicle body and one or more of the wheels can occur. As a consequence, there is a varying difference between the orientation of the vehicle body and the orientation of the wheel-base that engages the surface. Being able to determine this difference, the vehicle body tilt, is helpful for a number of reasons, including without limitation, to aim headlights to more effectively illuminate the surface and reduce impacts to oncoming vehicles. As another example, aspects of the suspension system itself may be adaptively tuned in response to current surface conditions or desired performance characteristics such as by avoiding bumps or dynamically adjusting to small changes in road contours (i.e. pot holes or speed bumps) or by applying tilt to the vehicle body with respect to the wheel-base during dynamic maneuvers to minimize side-to-side or forward-aft lean for passenger comfort. As will be described in the following materials, this disclosure satisfies these and other needs.

SUMMARY

As will be described in detail below, this disclosure includes a method for estimating vehicle body tilt. Tilt represents a difference a vehicle body frame of reference and a wheel-base frame of reference. The method involves obtaining information from at least one sensor assembly for a body of a vehicle, wherein the sensor assembly comprises motion sensors, obtaining information from at least one sensor assembly for a wheel-base of the vehicle, wherein the sensor assembly comprises motion sensors and obtaining absolute navigational information about the vehicle from an external source. A navigation solution for the vehicle body is generated based at least in part on the vehicle body sensor assembly information and the absolute navigational information and a navigation solution for the wheel-base is generated based at least in part on the wheel-base sensor assembly information and the absolute navigational information. Vehicle body tilt is determined based at least in part on the vehicle body navigation solution and the wheel-base navigation solution.

This disclosure also includes a system for estimating vehicle body tilt, including at least one sensor assembly for a body of a vehicle, wherein the sensor assembly comprises motion sensors, at least one sensor assembly for a wheel-base of the vehicle, wherein the sensor assembly comprises motion sensors, a receiver for obtaining absolute navigational information about the vehicle from an external source and at least one processor, such that the processor may be configured to generate a navigation solution for the vehicle body based at least in part on vehicle body sensor assembly information and the absolute navigational information, generate a navigation solution for the wheel-base based at least in part on wheel-base sensor assembly information and the absolute navigational information and determine vehicle body tilt based at least in part on the vehicle body navigation solution and the wheel-base navigation solution.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary portable devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet, a local area network (LAN) or a Controller Area Network (CAN) as well as others. Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

Figure 1:
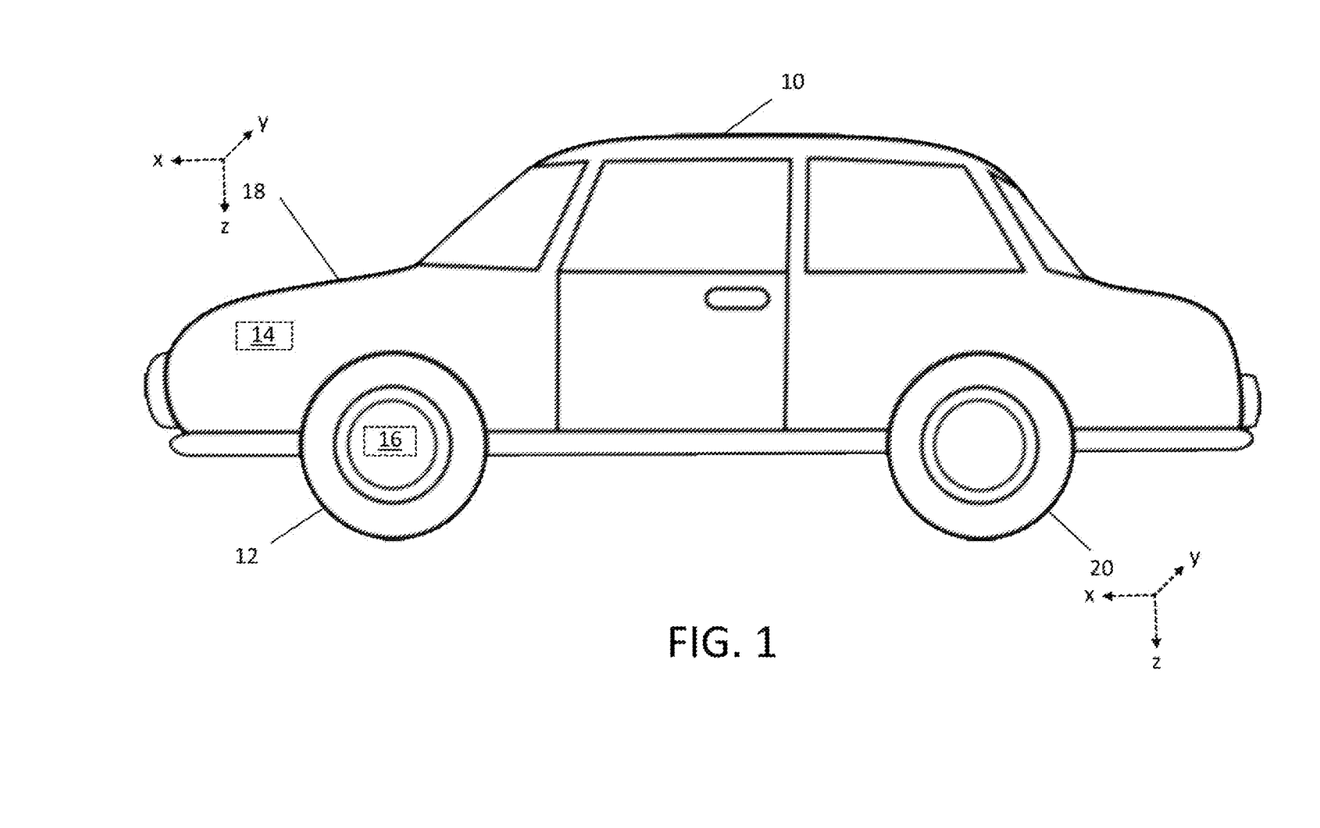
FIG. 1 is a schematic representation of a vehicle for which vehicle body tilt is determined according to an embodiment.

As noted above, it is desirable to determine vehicle body tilt, which is the difference between a vehicle body frame of reference and a wheel-base frame of reference. The techniques of this disclosure can work with multiple types of vehicles including cars, trucks, and buses. All these types of vehicles may have varying types of suspension systems. Some vehicle types may have a solid rear axle, some other vehicle types may have independent wheels (no solid axle). In some cases, the wheel-base frame may be the chassis, in some other all wheels are independent (such as for example uni-body designs). The techniques are capable of working with all these cases. A schematic view of a representative moving vehicle 10 is shown in FIG. 1, typically having four wheels 12 although the techniques of this disclosure may be applied to vehicles having any number of wheels, such as two, three, four or more than four. Thus, vehicle 10 may be a car, an automobile, or any other type of passenger vehicle, a truck, a bus, a motor coach, or any other wheeled vehicle. Additionally, the techniques may also be applied to other means for engaging a surface over which the vehicle travels, such as skids, runners, treads or others. At least one sensor assembly 14 as described in further detail below is associated with the body of vehicle 10. Additional vehicle body sensor assemblies may be employed as desired, for example by positioning two sensor assemblies along either a transverse or longitudinal midline of the vehicle body or by positioning four sensors assemblies along both transverse and longitudinal midlines or with respect to four corners of the vehicle. Further, at least one sensor assembly 16 is associated with the wheel-base by being mounted below any suspension components that allow for relative movement between the wheel and the vehicle body. In some embodiments, the wheel-base sensor assembly can be mounted to a wheel hub or similar structure dedicated to the wheel. However, in other embodiments, the wheel-base sensor assembly can be mounted to any other suitable component that is below the suspension system, such as a solid axle or the like. Again for the sake of illustration and without limitation, additional wheel-base sensor assemblies can be employed as desired, such as by providing a sensor assembly for each wheel or by mounting a plurality of sensor assemblies transversely, longitudinally, or both, to suitable components that are below the suspension system.

Typically, it may be desirable to center the sensor assemblies laterally. There is little to no constraint on the lever arm between two sensor assemblies. In embodiments where high dynamics are to be captured, such as with bumps in the road, it may be desirable to position the sensor assemblies to exhibit a relatively small horizontal lever arm, resulting in a mostly vertical lever arm. This positioning is optional, but may facilitate capturing the same dynamics at the same time.

Figure 2:
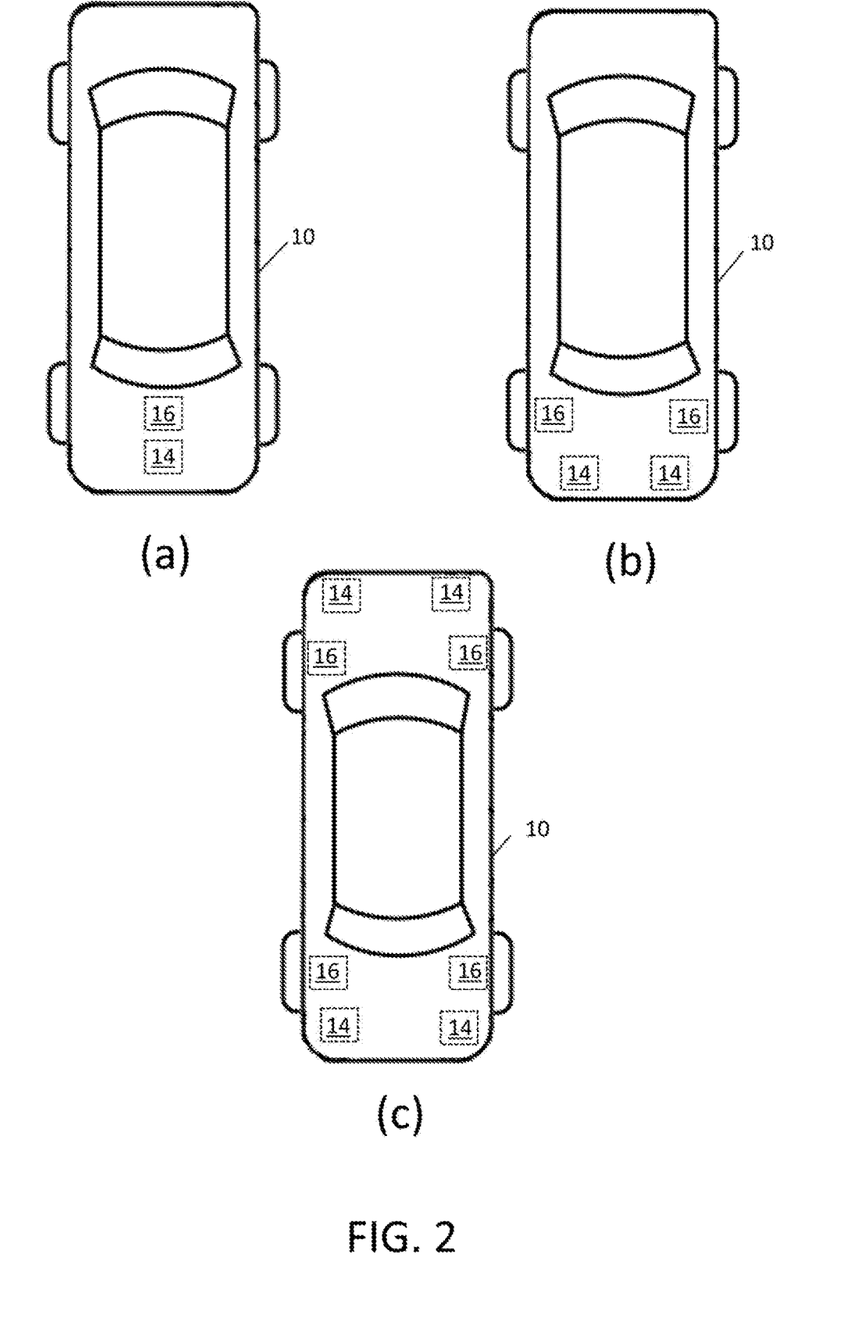
FIG. 2 is a schematic representation of the positioning of vehicle body sensor assemblies and wheel-base sensor assemblies according to different embodiments.

A non-limiting illustration of possible sensor assembly placements is schematically illustrated in FIG. 2. In particular, FIG. 2(a) shows vehicle body sensor assembly 14 and wheel-base sensor assembly 16 positioned centrally. The embodiment shown in FIG. 2(b) shows two sensor assemblies 14 for the vehicle body and two sensor assemblies 16 for the wheel-base, each pair being in laterally symmetric positions with respect to vehicle 10. Depending on the embodiment either one or both pairs may be employed. Still further, FIG. 2(c) illustrates four sensor assemblies 14 for the vehicle body and four sensor assemblies 16 for the wheel-base, with one assembly of each positioned in respective quadrants of vehicle 10. Again, depending on the embodiment, either or both sets of sensor assemblies may be employed as desired.

As indicated, the body of vehicle 10 has a frame of reference 18 and the wheel-base similarly has a frame of reference 20. In this exemplary depiction, the x-axis projects to the left of the figure representing the forward or along-track axis, the y-axis projects inwardly to the figure representing the lateral or cross-track axis, and the z-axis projects to the bottom of the figure representing the downward vertical axis. The techniques of this disclosure are directed to estimating or otherwise determining the difference between these frames of reference which as noted above is termed vehicle body tilt. When one sensor assembly is associated with either the vehicle body or the wheel-base, the orientation of this assembly may be used to directly represent the respective frame of reference. When a plurality of sensor assemblies are used for either the vehicle body or the wheel-base, the orientations can be averaged or otherwise combined to represent the respective frame of reference or vehicle body tilt can be estimated with respect to each as desired. Thus, as used herein vehicle body sensor assembly information may refer to motion sensor data from one or more sensor assemblies, all of which represent motion of the vehicle body. Similarly, wheel-base sensor assembly information may refer to motion sensor data from one or more sensor assemblies, all of which represent motion of the wheel-base. Further, it should also be appreciated that any suitable formalism may be employed when expressing attitude or orientation, such as by using Euler angles, quaternions, rotation matrices and others. Thus, although specific embodiments in the following discussion are described in the context of Euler angles, the techniques are not limited to such representations.

Figure 3:
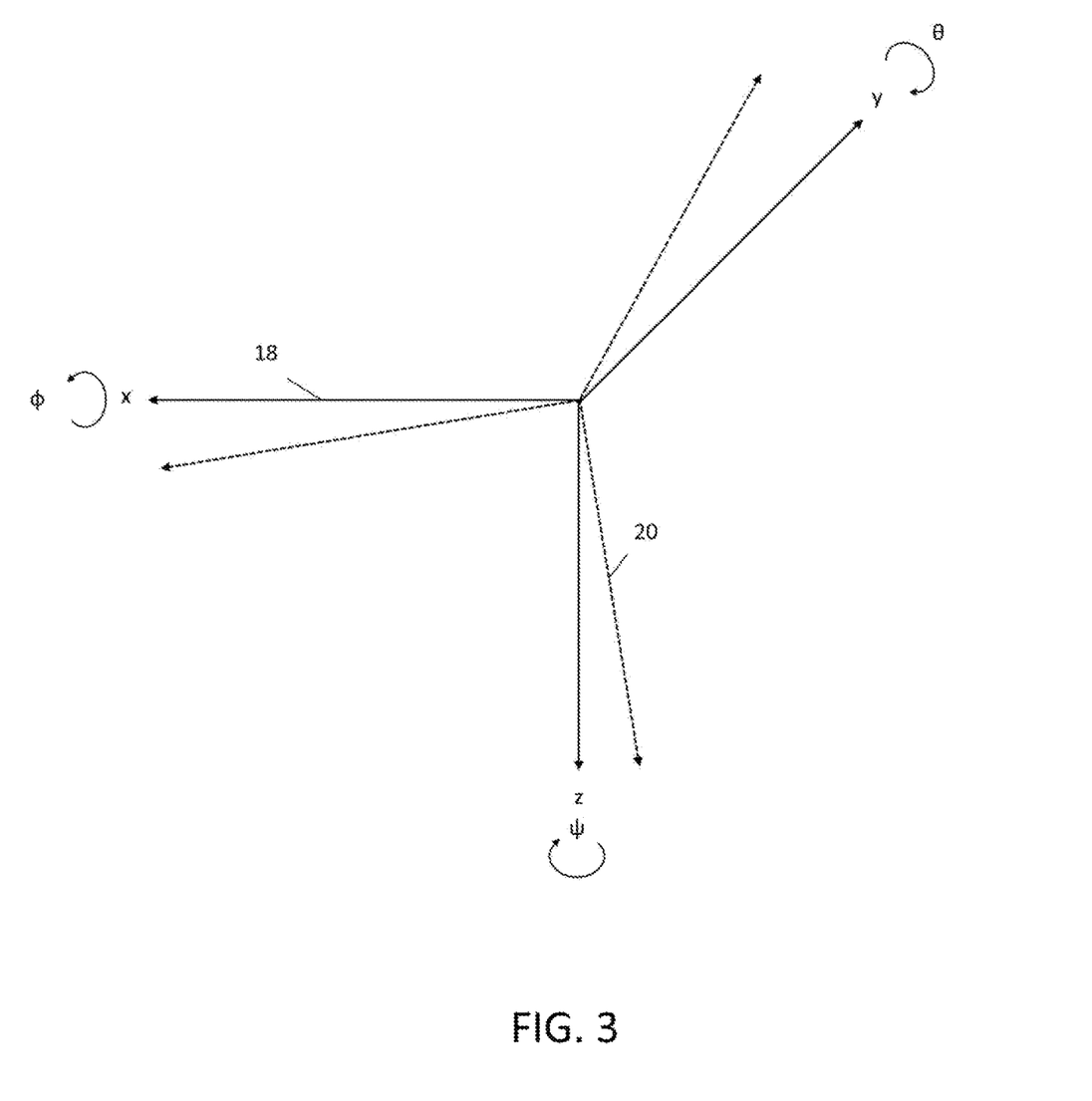
FIG. 3 is schematic diagram representing vehicle body tilt as the difference between a frame of reference of the vehicle body and a frame of reference of the wheel-base, according to an embodiment.

Next, FIG. 3 schematically depicts the vehicle body frame of reference 18 in comparison with the wheel-based frame of reference 20. As such, the difference between these frames of reference, "vehicle body tilt," can be considered as an angular rotation with respect to one or more axes, and may be a combination of the relevant orientation components. Conventionally in the North, East, Down (NED) notation, the depicted rotation of angle $\theta$ around the y-axis is termed pitch, the depicted rotation of angle $\varphi$ around the x-axis is termed roll and the depicted rotation of angle $\psi$ is termed heading (or azimuth or yaw). The techniques of this disclosure can therefore be used to estimate the difference between the vehicle body frame of reference 18 in comparison with the wheel-based frame of reference 20 with respect to one or more of these orientation components. Similarly, when different representations of attitude are employed, the difference between the frames of references can be expressed as appropriate for those representations. Alternatively or in addition, the orientation of sensor assemblies 14 and 16 can be represented as a misalignment with respect to either the vehicle body frame of reference 18 or the wheel-based frame of reference 20, such that vehicle body tilt is determined as taking the difference of the misalignment between vehicle body sensor assembly 14 and wheel-base frame of reference 20 and the misalignment between wheel-base sensor assembly 16 and wheel-base frame of reference 20. As discussed above, estimating vehicle tilt provides useful information that can be employed for purposes such as controlling or aiming headlights to provide better illumination of the road surface and/or minimize unwanted glare for oncoming drivers. Further, the behavior of the vehicle suspension system may be modified in response to vehicle tilt information, including by dynamically adjusting for deviations in road contours or to change vehicle body tilt during dynamic driving maneuvers for performance or comfort. Moreover, by estimating tilt for each vehicle axis, the difference between each axle can be used to facilitate vehicle maintenance such as by setting wheel alignment.

The sensor assemblies 14 and 16 include inertial motion sensors providing measurements that may be used to generate navigation solutions for the vehicle body and for the wheel-base, respectively. Notably, motion sensor data includes information from accelerometers, gyroscopes, or other implementations of an inertial measurement unit (IMU). Inertial sensors are self-contained sensors that use gyroscopes to measure the rate of rotation/angle, and accelerometers to measure the specific force (from which acceleration is obtained). Inertial sensors data may be used in an inertial navigation system (INS), which is a non-reference based relative positioning system. Using initial estimates of position, velocity and orientation angles of the moving platform as a starting point, the INS readings can subsequently be integrated over time and used to determine the current position, velocity and orientation angles of the platform. Typically, measurements are integrated once for gyroscopes to yield orientation angles and twice for accelerometers to yield position of the platform incorporating the orientation angles. A state estimation technique, such as a filter, including a prediction phase and an update phase (which may also be termed a measurement update phase) may be used to generate the navigation solution for the frames associated with the respective sensor assemblies. A state estimation technique also uses a system model and measurement model(s) based on what measurements are used. The system model is used in the prediction phase, and the measurement model(s) is/are used in the update phase. In a total-state approach, the state estimation or filtering technique is estimating the state of the device itself (such as position, velocity, and attitude of the device), the system model or the state transition model used is the motion model itself, which in case of inertial navigation is a nonlinear model, this model is a total-state model since the estimated state is the state of the navigation device itself. In an error-state approach, the motion model is used externally in what is called inertial mechanization, with the output of this model being the navigation states of the module, such as position, velocity, and attitude. The state estimation or filtering technique estimates the errors in the navigation states obtained by the mechanization, so the estimated state vector by this state estimation or filtering technique is for the error states, and the system model is an error-state system model which transitions the previous error-state to the current error-state. The mechanization output is corrected for these estimated errors to provide the corrected navigation states, such as corrected position, velocity and attitude. The estimated error-state is about a nominal value which is the mechanization output, the mechanization can operate either unaided in an open loop mode, or can receive feedback from the corrected states, this case is called closed-loop mode. Examples of suitable state estimation techniques include a Kalman filter (KF), an extended Kalman filter (EKF), an unscented Kalman filter(UKF), and a particle filter (PF). Correspondingly, as used herein, the navigation solutions calculated, derived or otherwise generated for vehicle body sensor assembly 14 and wheel-base sensor assembly 16 may be a full navigation solution with position, velocity and attitude, or may be a partial navigation solution with position and attitude or attitude alone. A navigation solution may also include misalignment estimation for a sensor assembly. As discussed below, the navigation solutions comprising attitude may be employed to estimate vehicle body tilt with respect to one or more orientation components or with respect to misalignments of the sensor assemblies. Navigation solutions comprising position information may be used for additional determinations, such as determining vehicle heave or ride height.

Figure 4A:
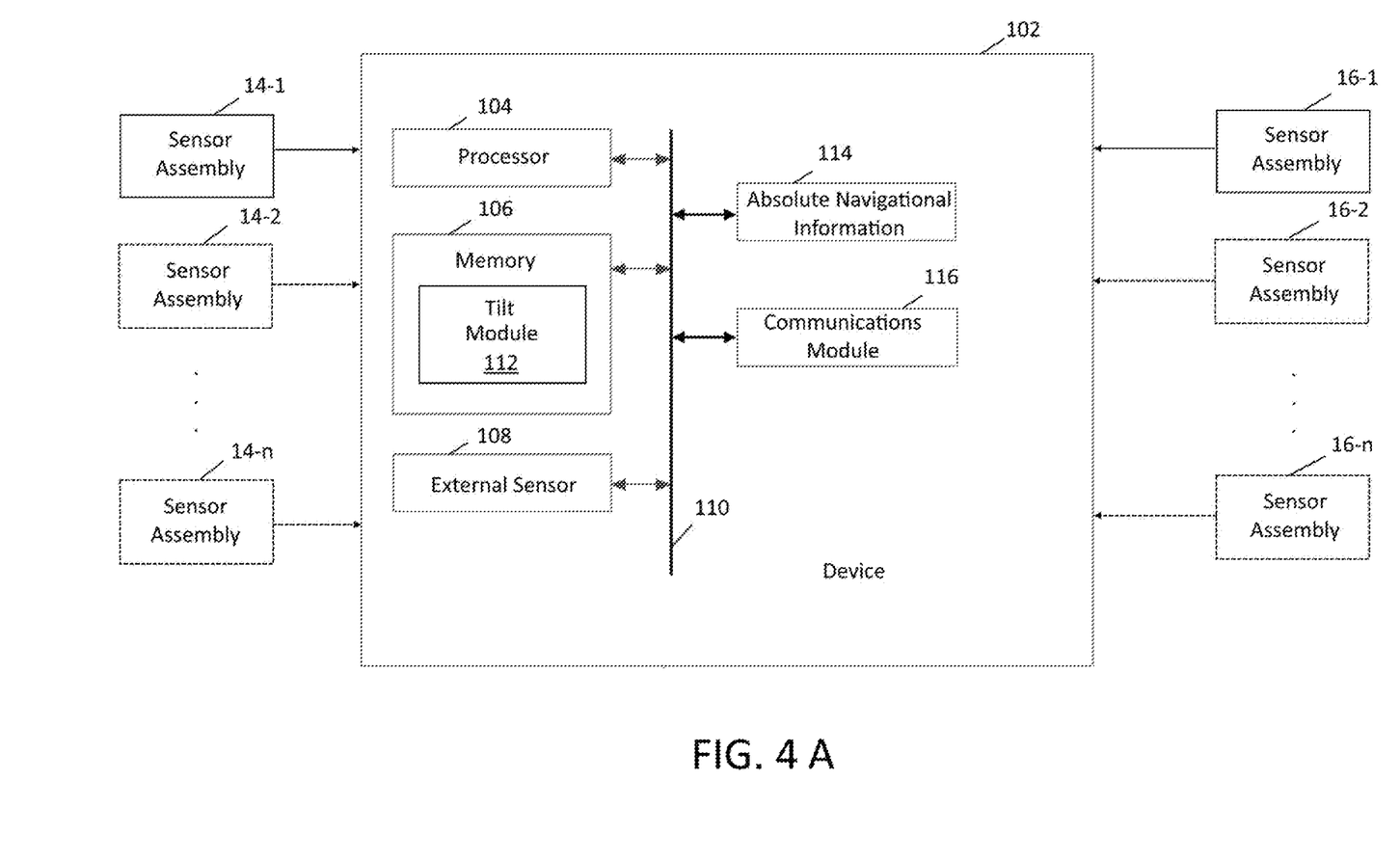
FIGS. 4A and 4B are schematic representations of different system architectures of devices and sensor assemblies for the vehicle body and/or the wheel-base, according to embodiments.

An exemplary system 100 that may incorporate vehicle body sensor assembly 14 and/or wheel-base sensor assembly 16 is depicted in FIG. 4A with high level schematic blocks. As shown, system 100 includes a device 102 having processor 104, which may be one or more microprocessors, central processing units (CPUs), or other processors to run software programs, which may be stored in memory 106, associated with the functions of device 102. Multiple layers of software can be provided in memory 106, which may be any combination of computer readable medium such as electronic memory or other storage medium such as hard disk, optical disk, etc., for use with the processor 104. For example, an operating system layer can be provided for device 102 to control and manage system resources in real time, enable functions of application software and other layers, and interface application programs with other software and functions of device 102. Similarly, different software application programs such as navigation software, communications software, such as telephony or wireless local area network (WLAN) software, or any of a wide variety of other software and functional interfaces can be provided. In some embodiments, multiple different applications can be provided on a single device 102, and in some of those embodiments, multiple applications can run simultaneously.

System 100 includes one or more sensor assemblies 14-1, . . . , 14-n associated with the vehicle body and one or more sensor assemblies 16-1, . . . , 16-n associated with the wheel-base as discussed above. Each sensor assembly may be an inertial measurement unit (IMU) for providing motion sensor data representing motion in space, including inertial sensors such as an accelerometer and a gyroscope, other motion sensors including a magnetometer, a pressure sensor or others may be used in addition. Depending on the configuration, each IMU measures one or more axes of rotation and/or one or more axes of acceleration of the device. In one embodiment, an IMU may include inertial rotational motion sensors or inertial linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by processor 104, or other processing resources of system 100, combines data from an IMUs to provide a six axis determination of motion or six degrees of freedom (6DOF). Still further, an IMU may include a magnetometer measuring along three orthogonal axes and output data to be fused with the gyroscope and accelerometer inertial sensor data to provide a nine axis determination of motion. Likewise, an IMU may also include a pressure sensor to provide an altitude determination that may be fused with the other sensor data to provide a ten axis determination of motion. As desired, IMUs may be implemented using Micro Electro Mechanical System (MEMS), allowing integration into a single small package.

Optionally, system 100 may feature a source of supplemental information in the form of external sensor 108, and may represent one or more sensors as described above, such as inertial motion sensors (i.e., accelerometer and/or a gyroscope), other motion sensors or other types of sensors. As used herein, "external" means a sensor that is not integrated with device 102. Also alternatively or in addition, the IMUs and/or external sensor 108 may be configured to measure one or more other aspects about the environment surrounding system 100. This is optional and not required in all embodiments. For example, a pressure sensor and/or a magnetometer may be used to refine motion determinations. Although described in the context of one or more sensors being MEMS based, the techniques of this disclosure may be applied to any sensor design or implementation. As an additional optional embodiment, external sensor 108 may also represent a source of information about the speed of vehicle 10, such as from an odometer or speedometer.

In the embodiment shown, processor 104, memory 106 and other components of device 102 may be coupled through bus 110, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between processor 102 and memory 104.

As will be discussed in detail below, the techniques of this disclosure involve estimating vehicle body tilt with the motion sensor data provided by sensor assemblies 14 and 16 (and optionally other sensors). Device 102 obtains input from the other sensor assemblies of system 100 as indicated. Algorithms, routines or other instructions for processing sensor data, including those obtained as input from other sensor assemblies, may be employed by tilt module 112 to perform any of the operations associated with the techniques of this disclosure. As discussed in further detail below, the estimation of vehicle body tilt involves determining navigation solutions for one or more vehicle body sensor assemblies 14 and one or more wheel-base sensor assemblies 16. As such, each respective sensor assembly may derive, calculate or employ any suitable technique to generate its own navigation solution or this operation may be centralized in tilt module 112, with the sensor assemblies simply providing the respective motion sensor data and other necessary measurements. Any other division of these operations may also be employed as desired. Further, determining the navigation solutions may involve sensor fusion or similar operations performed by the processor 104, which may be using the memory 106, or any combination of other processing resources.

Moreover, tilt module 112 employs absolute navigational information 114, such as a Global Navigation Satellite System (GNSS) receiver, including without limitation the Global Positioning System (GPS), the Global Navigation Satellite System (GLONASS), Galileo, Beidou, Indian Regional Navigation Satellite System (IRNSS), and/or Quazi-Zenith Satellite System (QZSS), and may further include Satellite Based Augmentation Systems (SBAS) such as Wide Area Augmentation System (WAAS) and European Geostationary Navigation Overlay Service (EGNOS) if desired, as well as WiFi™ positioning, cellular tower positioning, Bluetooth™ positioning beacons or other similar methods when deriving a navigation solution. For example, a wireless communication protocol may provide a navigation solution determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. The source of absolute navigational information represents a "reference-based" system that depends upon external sources of information, as opposed to self-contained navigational information that is provided by self-contained and/or "non-reference based" systems within a device/platform, such as IMU 106 as noted above. The source of absolute navigational information 114 may be implemented by device 102 itself, or it may receive the information in any suitable manner.

Correspondingly, in some embodiments, device 102 may include communications module 116 for any suitable purpose, including for receiving input from the sensor assemblies 14 and 16 and/or the absolute navigational information 116, or for outputting navigation solutions and/or sensor information about system 100 to another device. Communications module 116 may employ a Wireless Local Area Network (WLAN) conforming to Institute for Electrical and Electronic Engineers (IEEE) 802.11 protocols, featuring multiple transmit and receive chains to provide increased bandwidth and achieve greater throughput. For example, the 802.11ad (WiGIG™) standard includes the capability for devices to communicate in the 60 GHz frequency band over four, 2.16 GHz-wide channels, delivering data rates of up to 7 Gbps. Other standards may also involve the use of multiple channels operating in other frequency bands, such as the 5 GHz band, or other systems including cellular-based and WLAN technologies such as Universal Terrestrial Radio Access (UTRA), Code Division Multiple Access (CDMA) networks, Global System for Mobile Communications (GSM), IEEE 802.16 (WiMAX), Long Term Evolution (LTE), other transmission control protocol, internet protocol (TCP/IP) packet-based communications, or the like may be used. In some embodiments, multiple communication systems may be employed to leverage different capabilities. Typically, communications involving higher bandwidths may be associated with greater power consumption, such that other channels may utilize a lower power communication protocol such as BLUETOOTH®, ZigBee®, ANT or the like. Further, a wired connection may also be employed. Generally, communication may be direct or indirect, such as through one or multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As will be appreciated, processor 104 and/or other processing resources of device 102 may be one or more microprocessors, central processing units (CPUs), or other processors which run software programs for device 102 or for other applications related to the functionality of system 100. For example, different software application programs such as a menu, navigation software, games, camera function control, navigation software, and phone or a wide variety of other software and functional interfaces can be provided. In some embodiments, multiple different applications can be provided on a single device 102, and in some of those embodiments, multiple applications can run simultaneously on the device 102. Multiple layers of software can be provided on a computer readable medium such as electronic memory or other storage medium such as hard disk, optical disk, flash drive, etc., for use with processor 104. For example, an operating system layer can be provided for device 102 to control and manage system resources in real time, enable functions of application software and other layers, and interface application programs with other software and functions of device 102. In some embodiments, one or more motion algorithm layers may provide motion algorithms for lower-level processing of raw sensor data provided from internal or external sensors. Further, a sensor device driver layer may provide a software interface to the hardware sensors of device 102. Some or all of these layers can be provided in memory 106 for access by processor 104 or in any other suitable architecture. Embodiments of this disclosure may feature any desired division of processing between processor 104 and other processing resources, as appropriate for the applications and/or hardware being employed. Aspects implemented in software may include but are not limited to, application software, firmware, resident software, microcode, etc, and may take the form of a computer program product accessible from a computer-usable or computer-readable medium providing program code for use by or in connection with a computer or any instruction execution system, such as processor 104, a dedicated processor or any other processing resources of device 102.

Figure 4B:
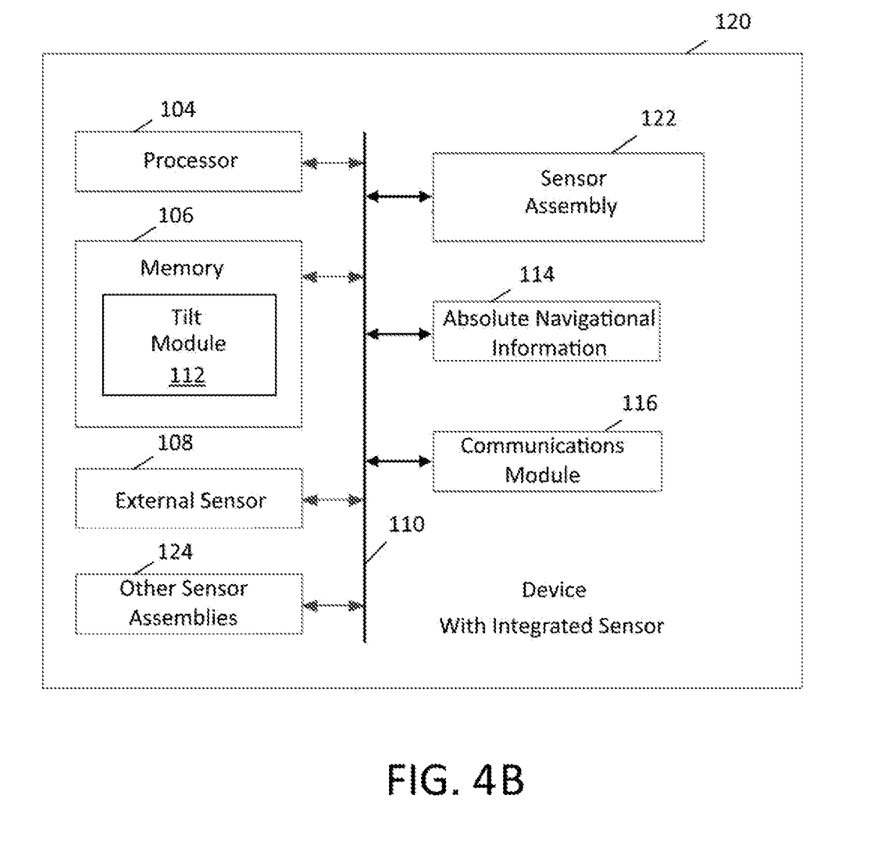

Other alternative system architectures may also be employed when implementing the techniques of this disclosure. For example, FIG. 4B schematically depicts a device 120 having an integrated sensor assembly (IMU 122), with components and modules in common with FIG. 4A being designated with the same reference numbers. In these alternatives, IMU 122 functions as either a vehicle body sensor assembly 14 or a wheel-base sensor assembly 16. Correspondingly, the sensor data from other sensor assemblies used is provided as input 124. As will be appreciated, any combination of functionality can be used. In one example, device 120 may be configured for mounting above the vehicle suspension, so that IMU 122 functions as the at least one vehicle body sensor assembly 14. Thus, the input from other sensor assemblies 124 is at least from one wheel-base sensor 16 and may optionally include input from other vehicle body sensor assemblies 14 if present as well as from additional wheel-base sensor assemblies 16 if present. Likewise, device 120 may be configured for mounting below the vehicle suspension, so that IMU 122 functions as the at least one wheel-base sensor assembly 16 in another example. Accordingly, the input from other sensor assemblies 124 is at least from one vehicle body sensor assembly 14 and may optionally include input from any additional vehicle body sensor assemblies 14 as well as from any additional wheel-base sensor assemblies 16.

Figure 5:
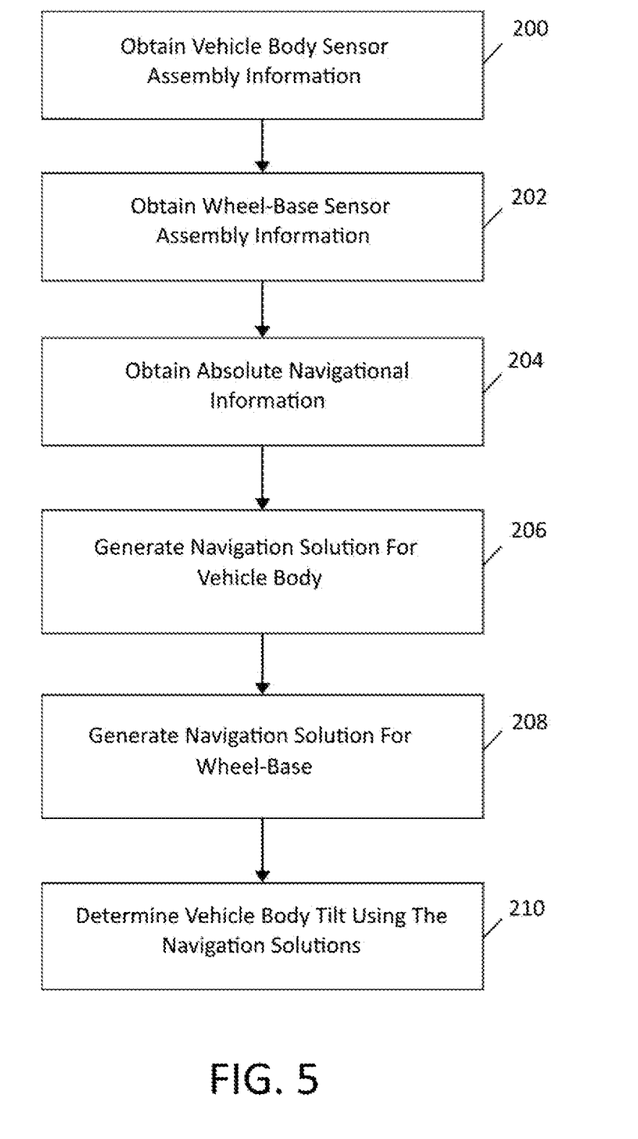
FIG. 5 is a flowchart showing a routine for estimating vehicle body tilt according to an embodiment.

To help illustrate the techniques of this disclosure, FIG. 5 depicts an exemplary routine for estimating vehicle body tilt. Beginning with 200, vehicle body sensor assembly information is obtained. In 202, wheel-base sensor assembly information is obtained. Absolute navigational information about the vehicle is obtained from an external source in 204. Corresponding, a navigation solution for the vehicle body based at least in part on the vehicle body sensor assembly information and the absolute navigational information is generated in 206 and a navigation solution for the wheel-base based at least in part on the wheel-base sensor assembly information and the absolute navigational information is generated in 208. In 210, vehicle body tilt is determined based at least in part on the vehicle body navigation solution and the wheel-base navigation solution.

In one aspect, the vehicle body tilt may be a difference between a value of at least one orientation component from the vehicle body navigation solution and a value of a corresponding orientation component from the wheel-base navigation solution. The at least one orientation component may be one of pitch, roll and heading.

In one aspect, the vehicle body tilt comprises a difference between a mounting misalignment between the vehicle body sensor assembly and the vehicle wheel-base frame from the vehicle body navigation solution and a mounting misalignment between the wheel-base sensor assembly and the vehicle wheel-base frame from the wheel-base navigation solution. The mounting misalignment may be at least one of a pitch misalignment, a roll misalignment and a heading misalignment.

In one aspect, the vehicle body navigation solution and the wheel-base navigation solution may be generated by state estimation techniques.

In one aspect, the vehicle body sensor assembly and the wheel-base sensor assembly may have accelerometers and gyroscopes.

In one aspect, at least one of the vehicle body navigation solution and the wheel-base navigation solution may be further based on information from at least one of: i) an odometer or means for obtaining vehicle speed, ii) a pressure sensor, and iii) a magnetometer.

In one aspect, obtaining information from the vehicle body sensor assembly and the obtaining information from the wheel-base sensor assembly may include at least one of: i) positioning the vehicle body sensor assembly and the wheel-base sensor assembly centrally with respect to a lateral dimension of the vehicle, ii) providing at least one additional sensor assembly for the vehicle body and positioning the vehicle body sensor assemblies in laterally symmetric positions, iii) providing at least one additional sensor assembly for the wheel-base and positioning the wheel-base sensor assemblies in laterally symmetric positions, iv) providing four sensor assemblies for the vehicle body and positioning one vehicle body sensor assembly in each quadrant of the vehicle, and v) providing four sensor assemblies for the wheel-base and positioning one wheel-base sensor assembly in each quadrant of the vehicle.

In one aspect, a higher rate attitude task may be performed to calculate attitude angles about the vehicle at a higher rate than the navigation solution for the vehicle body and the wheel-base. The higher rate attitude task may be reinitialized based on the navigation solution for at least one of the vehicle body and the wheel-base.

In one aspect, the navigation solution for at least one of the vehicle body and the wheel-base may be determined in the absence of absolute navigational information using sensor errors determined during a period of absolute navigational information availability. The navigation solution for at least one of the vehicle body and the wheel-base determined in the absence of absolute navigational information may further be based on information from an odometer or means for obtaining vehicle speed.

In one aspect, at least one orientation component may be calculated in the absence of absolute navigational information using one of: i) accelerometer information only, and ii) accelerometer information and vehicle speed information.

In one aspect, the navigation solution for the vehicle body and the navigation solution for the wheel-base include position information may also estimate vehicle heave.

In one aspect, a lighting system of the vehicle may be adjusted based on the estimated vehicle body tilt.

In one aspect, a suspension system of the vehicle may be adjusted based on the estimated vehicle body tilt.

As previously noted, this disclosure also is directed to a system for estimating vehicle body tilt, including at least one sensor assembly for a body of a vehicle, wherein the sensor assembly comprises motion sensors, at least one sensor assembly for a wheel-base of the vehicle, wherein the sensor assembly comprises motion sensors, a receiver for obtaining absolute navigational information about the vehicle from an external source and at least one processor, such that the processor may be configured to generate a navigation solution for the vehicle body based at least in part on vehicle body sensor assembly information and the absolute navigational information, generate a navigation solution for the wheel-base based at least in part on wheel-base sensor assembly information and the absolute navigational information and determine vehicle body tilt based at least in part on the vehicle body navigation solution and the wheel-base navigation solution.

In one aspect, the vehicle body sensor assembly and the wheel-base sensor assembly may have accelerometers and gyroscopes.

In one aspect, the system may have a source of supplemental information comprising at least one of: i) an odometer or means for obtaining vehicle speed, ii) a pressure sensor, and iii) a magnetometer, such that the at least one processor provides a navigation solution for at least one of the vehicle body and the wheel-base further based on the supplemental information.

In one aspect, the system may have the at least one vehicle body sensor assembly and the at least one wheel-base sensor assembly positioned centrally with respect to a lateral dimension of the vehicle.

In one aspect, the system may have at least one additional sensor assembly for the vehicle body, the vehicle body sensor assemblies being positioned in laterally symmetric positions;

In one aspect, the system may have at least one additional sensor assembly for the wheel-base, the wheel-base sensor assemblies being positioned in laterally symmetric positions.

In one aspect, the system may have four sensor assemblies for the vehicle body, one vehicle body sensor assembly being positioned in each quadrant of the vehicle.

In one aspect, the system may have four sensor assemblies for the wheel-base, one wheel-base sensor assembly being positioned in each quadrant of the vehicle.

In one aspect, at least one of the sensor assemblies may be implemented as a Micro Electro Mechanical System (MEMS).

EXAMPLES

As described above, the techniques of the disclosure may involve using any motion sensor information from sensor assemblies associated with the vehicle body and with the wheel-base to estimate vehicle body tilt. As an illustration, the following example is presented in the context of determining vehicle tilt with respect to a difference in the vehicle body frame 18 and the wheel-base frame 20 resulting from rotation of the vehicle body about a latitudinal axis, which as noted above may be termed pitch. However, these techniques can readily be extended to other suitable orientation components within the same formalism, such as roll and heading, or other representations of attitude may be employed as desired.

Figure 6:
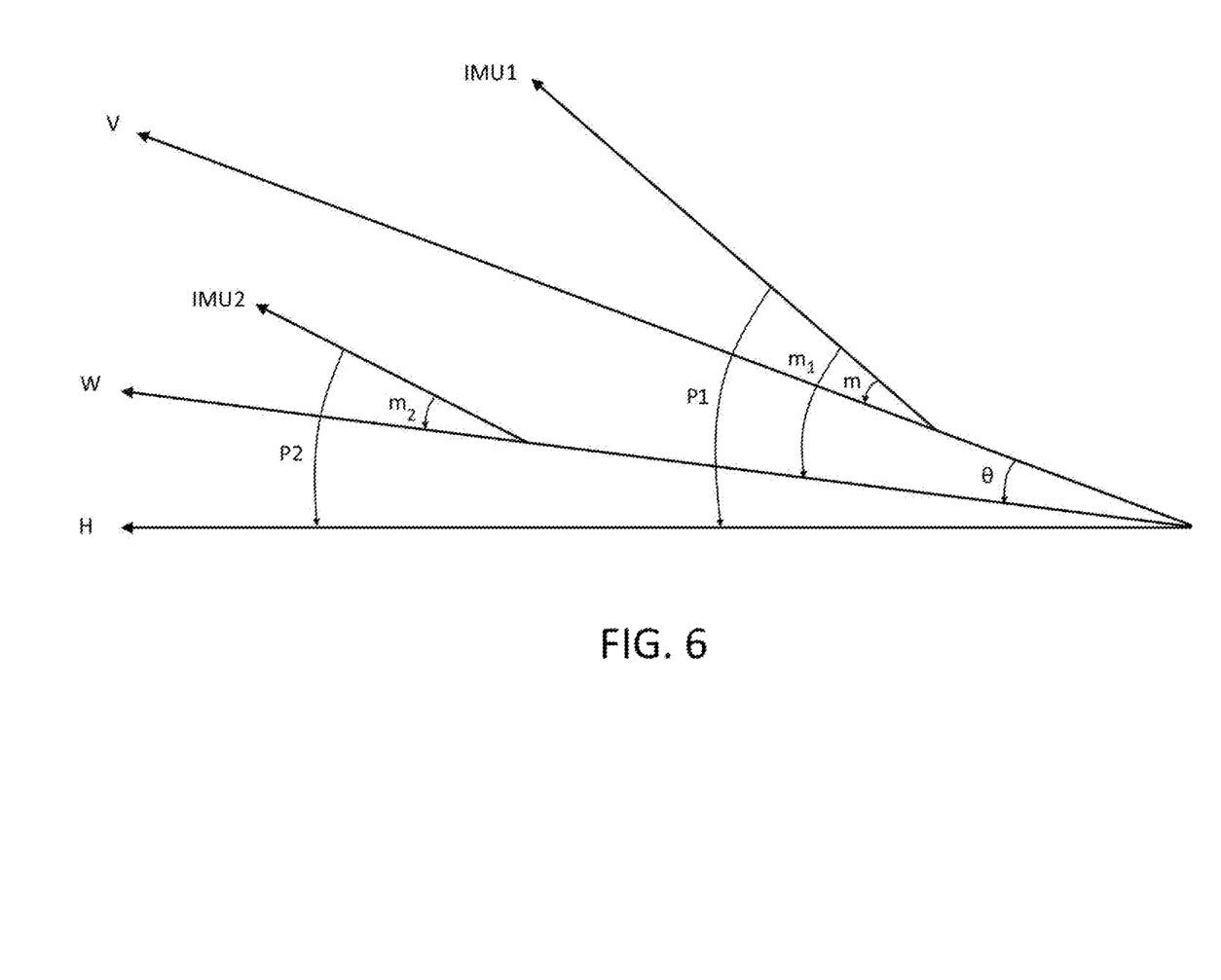
FIG. 6 is a schematic representation of vehicle body tilt as related to the pitch and pitch misalignment of sensor assemblies, according to an embodiment.

Turning now to FIG. 6, a schematic illustration of various aspects of pitch in the context of vehicle 10 is shown. For reference, vector H represents horizontal in the Earth's frame of reference. Due to terrain variations or other surface features, the wheel-base may be inclined or declined with the wheels in contact with the surface, with any deviation from horizontal being represented by the vector W. Correspondingly, any vehicle body tilt that may result from vehicle dynamics, such as accelerating, decelerating, cornering, aerodynamic forces or the like, is represented by the vector V, with the difference between the vehicle body frame 18 and the wheel-base frame 20 designated by the varying pitch angle θ and, as such, the techniques of this disclosure determine this angle. Further, sensor assembly 14 is mounted in a fixed relation with respect to the vehicle body, but may have a mounting misalignment with respect to the vehicle body. Therefore, the orientation of sensor assembly 14 is represented by the vector IMU1 such that its pitch is given by angle P1 and the pitch mounting misalignment is given by angle m. Likewise, sensor assembly 16 is mounted in a fixed relation with respect to the wheel-base, as represented by the vector IMU2 with its pitch is given by angle P2 and any pitch mounting misalignment for this sensor assembly given by the angle $m_2$. Further, the mounting misalignment of sensor assembly 14 with respect to the wheel-base frame, is represented by the angle $m_1$, and its value is given by Equation (1).

$$m_1 = m + \theta \quad (1)$$

In turn, the difference between the mounting misalignment of sensor assembly 14 with respect to the wheel base frame ($m_1$) and the mounting misalignment of sensor assembly 14 with respect to the vehicle body frame ($m_2$) can be written as Equation (2) by substituting Equation (1):

$$m_1 - m_2 = m + \theta - m_2 \quad (2)$$

Given that the mounting misalignments m and $m_2$ are fixed, their difference is also fixed and may be represented as F, allowing Equation (2) to be rewritten as indicated in Equation (3):

$$m_1 - m_2 = m - m_2 + \theta = F + \theta \quad (3)$$

Since F is constant as noted above, the vehicle body tilt in pitch can readily be determined from this equation. From the above, it may also be seen that F+θ can be calculated by taking the difference between the pitch of sensor assembly 14 (P1) and the pitch of sensor assembly 16 (P2), as indicated in Equation (4):

$$P1-P2=F+\theta \qquad (4)$$

As discussed above, any suitable state estimation technique may be used to determine navigation solutions for sensor assembly 14 and sensor assembly 16, using the respective motion sensor data and the absolute navigational information. Thus, P1 and $m_1$ can be obtained from the navigation solution for sensor assembly 14, while P2 and $m_2$ can be obtained from the navigation solution for sensor assembly 16. Since θ can be calculated as either the difference in sensor assembly misalignment as per Equation (3) or sensor assembly pitch as per Equation (4), selection among the two techniques may be based on the intended application and desired performance. For example, although both sets of values are obtained from the navigation solutions calculated, derived or otherwise generated by state estimation techniques, and as such, represent filtered quantities, the misalignments are subject to a greater degree of filtration. Thus, calculating vehicle body tilt from the pitches represents a somewhat more dynamic measurement and therefore may be suitable for systems intended to compensate for more rapidly occurring variations, such as may be due to undulations in the road surface or the like. Conversely, calculating vehicle body tilt using the misalignments provides a characterization more suited to capture more constant effects on the vehicle body, such as cargo load and passenger weight.

Again, although the above examples are in the context of vehicle body tilt with respect to pitch, it should be appreciated that the techniques of this disclosure are readily applicable to vehicle body tilt with respect to other orientation components or misalignments, such as heading and roll. Further details regarding the calculation of pitch, roll and/or heading misalignment using motion sensor data are provided in commonly-owned U.S. Pat. No. 8,756,001, "Method And Apparatus For Improved Navigation Of A Moving Platform," U.S. Pat. No. 9,784,582, "Method And Apparatus For Navigation With Nonlinear Models," U.S. Pat. No. 9,797,727 "Method And Apparatus For Determination Of Misalignment Between Device And Vessel Using Acceleration/Deceleration," U.S. Pat. No. 10,203,207, "Methods Of Attitude And Misalignment Estimation For Constraint Free Portable Navigation," U.S. Pat. No. 10,228,252, "Method And Apparatus For Using Multiple Filters For Enhanced Portable Navigation," and U.S. Pat. No. 10,274,317, "Method And Apparatus For Determination Of Misalignment Between Device And Vessel Using Radius Of Rotation," all of which are incorporated herein by reference in their entirety.

It should be appreciated that using absolute navigational information when providing the navigation solutions represents a number of benefits. For example, sensor errors (including bias offsets and drifts) may be calibrated using the absolute navigational information. This provides increased stability with respect to both time and temperature. Further, it should also be appreciated that the use of state estimation technique inherently provides filtered values as discussed above, which reduces noise and other artifacts. As an illustration of the suitability of these techniques, a representative system of one embodiment can achieve accuracy in the range of 0.05-0.1°.

Figure 7:
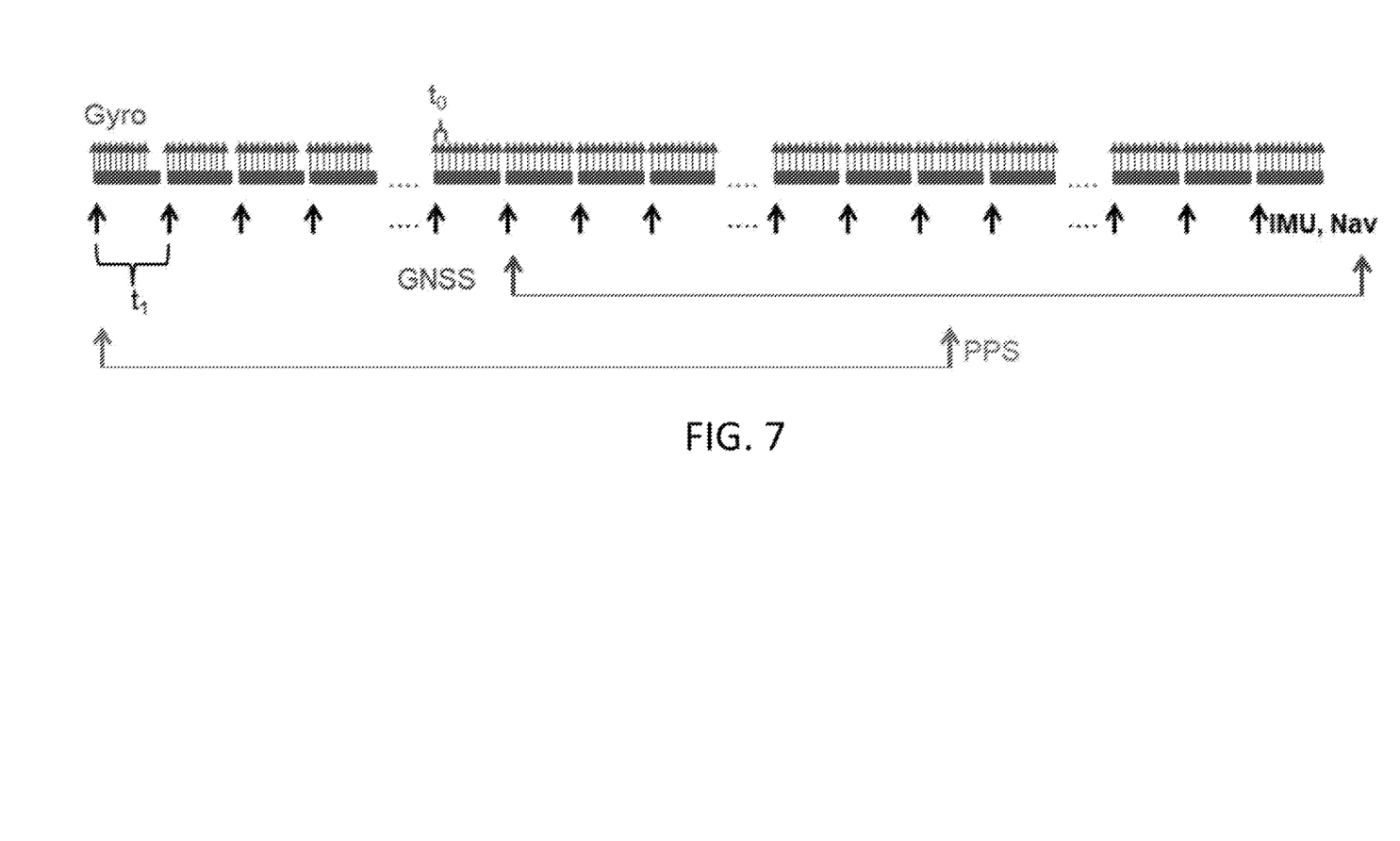
FIG. 7 is a schematic representation of a timing diagram for providing information from an attitude task at a higher rate than the navigation solutions, according to an embodiment.

Optionally, the techniques of this disclosure may leverage timing considerations as discussed in the following materials. For example, sensors assemblies 14 and 16 may output motion sensor data at different rates and the state estimation techniques used to provide the navigation solutions may also operate at different rates. For the purposes of illustration and not limitation, exemplary rates can include 20 Hz, 50 Hz, 100 Hz, 200 Hz, 500 Hz, 1 KHz, 4 KHz and others. Generally, it may be desirable to correlate the output data rate of the sensor assemblies with their available bandwidth, which may also be adjustable. Moreover, in some embodiments, a high-rate attitude task (such as for example using high rate quaternions) may be used to supplement the determinations available at a lower rate from the state estimation techniques. To help illustrate, FIG. 7 schematically illustrates a timing diagram showing the use of a higher rate attitude task being integrated with the techniques of this disclosure. As indicated, the top row represents the higher rate attitude task, such as from a gyroscope using quaternions, which provides output at the interval $t_0$. The next row represents the output rate of the navigation solutions from the state estimation technique based on the nominal operating rate of the sensor assembly. Correspondingly, the third row from the top represents the absolute navigational information, such as from GNSS together with its latency. The pulse per second (PPS) shown in the bottom provides the overall timing for the system. From this, it may be appreciated that the high rate attitude task can be corrected for biases and other errors using the estimation from the navigation solution. Even though the navigation solutions are generated at a lower rate, the bias of the high rate attitude task does not change rapidly, so the benefits of calibrating using the state estimation technique still apply. The high-rate attitude calculation may also be re-initialized to the navigation solution values at the rate at which the navigation solution runs (such as 100 Hz in this illustrative example). Further details regarding the implementation of such high rate attitude tasks may be found in commonly-owned U.S. Pat. No. 10,082,583, "Method And Apparatus For Real-Time Positioning And Navigation Of A Moving Platform," which is incorporated herein by reference in its entirety.

In another optional embodiment, the techniques of this disclosure may be initiated prior to the provision of navigation solutions from the state estimation techniques as well as during periods when the absolute navigational information is unavailable and/or regardless of motion of vehicle 10. This may be achieved by storing sensor errors (such as for example sensor biases) from a session when absolute navigational information was available and when navigation solutions were generated during vehicle motion. These stored sensor errors can then be used at a future time under the noted conditions. In such implementations, the calculations of attitude angles such as pitch and/or roll may be performed using accelerometer data alone when the vehicle is static or accelerometer data and odometer readings (or other measurements of vehicle speed) during motion. One benefit associated with this embodiment is the saving in power. Additional details regarding the calculation of pitch and/or roll pursuant to these embodiments may be found in commonly-owned U.S. Pat. Nos. 9,784,582 and 8,756,001, both incorporated by reference above.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different levels of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for estimating vehicle body tilt, wherein tilt represents a difference a vehicle body frame of reference and a wheel-base frame of reference, comprising:
   a) obtaining information from at least one sensor assembly for a body of a vehicle, wherein the sensor assembly comprises motion sensors;
   b) obtaining information from at least one sensor assembly for a wheel-base of the vehicle, wherein the sensor assembly comprises motion sensors;
   c) obtaining absolute navigational information about the vehicle from an external source;
   d) generating a navigation solution for the vehicle body based at least in part on the vehicle body sensor assembly information and the absolute navigational information;
   e) generating a navigation solution for the wheel-base based at least in part on the wheel-base sensor assembly information and the absolute navigational information; and
   f) determining vehicle body tilt based at least in part on the vehicle body navigation solution and the wheel-base navigation solution.

2. The method of claim 1, wherein the vehicle body tilt comprises a difference between a value of at least one orientation component from the vehicle body navigation solution and a value of a corresponding orientation component from the wheel-base navigation solution.

3. The method of claim 2, wherein the at least one orientation component is one of pitch, roll and heading.

4. The method of claim 1, wherein the vehicle body tilt comprises a difference between a mounting misalignment between the vehicle body sensor assembly and the vehicle wheel-base frame from the vehicle body navigation solution and a mounting misalignment between the wheel-base sensor assembly and the vehicle wheel-base frame from the wheel-base navigation solution.

5. The method of claim 4, wherein the mounting misalignment is at least one of a pitch misalignment, a roll misalignment and a heading misalignment.

6. The method of claim 1, wherein the vehicle body navigation solution and the wheel-base navigation solution are generated by state estimation techniques.

7. The method of claim 1, wherein the vehicle body sensor assembly and the wheel-base sensor assembly comprise accelerometers and gyroscopes.

8. The method of claim 1, wherein at least one of the vehicle body navigation solution and the wheel-base navigation solution is further based on information from at least one of:
   i) an odometer or means for obtaining vehicle speed;
   ii) a pressure sensor; and
   iii) a magnetometer.

9. The method of claim 1, wherein the obtaining information from the vehicle body sensor assembly and the obtaining information from the wheel-base sensor assembly comprises at least one of:
   i) positioning the vehicle body sensor assembly and the wheel-base sensor assembly centrally with respect to a lateral dimension of the vehicle;
   ii) providing at least one additional sensor assembly for the vehicle body and positioning the vehicle body sensor assemblies in laterally symmetric positions;
   iii) providing at least one additional sensor assembly for the wheel-base and positioning the wheel-base sensor assemblies in laterally symmetric positions;
   iv) providing four sensor assemblies for the vehicle body and positioning one vehicle body sensor assembly in each quadrant of the vehicle;
   v) providing four sensor assemblies for the wheel-base and positioning one wheel-base sensor assembly in each quadrant of the vehicle.

10. The method of claim 1, further comprising performing a higher rate attitude task to calculate attitude angles about the vehicle at a higher rate than the navigation solution for the vehicle body and the wheel-base.

11. The method of claim 10, further comprising reinitializing the higher rate attitude task based on the navigation solution for at least one of the vehicle body and the wheel-base.

12. The method of claim 1, wherein the navigation solution for at least one of the vehicle body and the wheel-base is determined in the absence of absolute navigational information using sensor errors determined during a period of absolute navigational information availability.

13. The method of claim 12, wherein the navigation solution for at least one of the vehicle body and the wheel-base is determined in the absence of absolute navigational information is further based on information from an odometer or means for obtaining vehicle speed.

14. The method of claim 1, further comprising calculating at least one orientation component in the absence of absolute navigational information using one of:

i) accelerometer information only; and
ii) accelerometer information and vehicle speed information.

15. The method of claim 1, wherein the navigation solution for the vehicle body and the navigation solution for the wheel-base include position information, further comprising estimating vehicle heave.

16. The method of claim 1, further comprising adjusting a lighting system of the vehicle based on the estimated vehicle body tilt.

17. The method of claim 1, further comprising adjusting a suspension system of the vehicle based on the estimated vehicle body tilt.

18. A system for estimating vehicle body tilt, wherein tilt represents a difference a vehicle body frame of reference and a wheel-base frame of reference, comprising:
   a) at least one sensor assembly for a body of a vehicle, wherein the sensor assembly comprises motion sensors;
   b) at least one sensor assembly for a wheel-base of the vehicle, wherein the sensor assembly comprises motion sensors;
   c) a receiver for obtaining absolute navigational information about the vehicle from an external source; and
   d) at least one processor configured to:
      i) generate a navigation solution for the vehicle body based at least in part on the vehicle body sensor assembly information and the absolute navigational information;
      ii) generate a navigation solution for the wheel-base based at least in part on the wheel-base sensor assembly information and the absolute navigational information; and
      iii) determine vehicle body tilt based at least in part on the vehicle body navigation solution and the wheel-base navigation solution.

19. The system of claim 18, wherein the vehicle body sensor assembly and the wheel-base sensor assembly comprises accelerometers and gyroscopes.

20. The system of claim 18, further comprising a source of supplemental information comprising at least one of:
   i) an odometer or means for obtaining vehicle speed;
   ii) a pressure sensor; and
   iii) a magnetometer;
   wherein the at least one processor is configured to provide a navigation solution for at least one of the vehicle body and the wheel-base further based on the supplemental information.

21. The system of claim 18, further comprising at least one of:
   i) the at least one vehicle body sensor assembly and the at least one wheel-base sensor assembly being positioned centrally with respect to a lateral dimension of the vehicle;
   ii) at least one additional sensor assembly for the vehicle body, the vehicle body sensor assemblies being positioned in laterally symmetric positions;
   iii) at least one additional sensor assembly for the wheel-base, the wheel-base sensor assemblies being positioned in laterally symmetric positions;
   iv) four sensor assemblies for the vehicle body, one vehicle body sensor assembly being positioned in each quadrant of the vehicle;
   v) four sensor assemblies for the wheel-base, one wheel-base sensor assembly being positioned in each quadrant of the vehicle.

22. The system of claim 18, wherein at least one of the sensor assemblies is implemented as a Micro Electro Mechanical System (MEMS).

* * * * *